Oct. 8, 1940. A. FRIZ Re. 21,593

MACHINE FOR THE GLUING TOGETHER OF THE EDGES OF VENEER SHEETS

Original Filed May 6, 1936 4 Sheets-Sheet 1

Inventor

Adolf Friz

By Foster & Cocker

Attorneys

Oct. 8, 1940. A. FRIZ Re. 21,593

MACHINE FOR THE GLUING TOGETHER OF THE EDGES OF VENEER SHEETS

Original Filed May 6, 1936 4 Sheets-Sheet 2

Inventor

Adolf Friz

By Foster Model

Attorney

Oct. 8, 1940. A. FRIZ Re. 21,593

MACHINE FOR THE GLUING TOGETHER OF THE EDGES OF VENEER SHEETS

Original Filed May 6, 1936 4 Sheets-Sheet 3

Inventor
Adolf Friz

By Foster & Codier
Attorneys

Oct. 8, 1940. A. FRIZ Re. 21,593

MACHINE FOR THE GLUING TOGETHER OF THE EDGES OF VENEER SHEETS

Original Filed May 6, 1936 4 Sheets-Sheet 4

Inventor

Adolf Friz

By Foster + Cordier

Attorneys

Reissued Oct. 8, 1940

Re. 21,593

UNITED STATES PATENT OFFICE 21,593

MACHINE FOR THE GLUING TOGETHER OF THE EDGES OF VENEER SHEETS

Adolf Friz, Stuttgart, Germany

Original No. 2,084,676, dated June 22, 1937, Serial No. 78,233, May 6, 1936. Application for reissue June 21, 1939, Serial No. 280,342. In Germany May 13, 1935

3 Claims. (Cl. 144—279)

My invention relates to the assembling of veneer sheets and has particular reference to a machine for assembling and jointing, by means of an adhesive, the edges of adjoining sheets without taking recourse to paper strips or the like.

As is well known to those skilled in the art, in the machines hitherto employed for this purpose, before the veneer sheets could be assembled, either glue or a means for making the glue set had to be deposited on the edges of the sheet and left to dry. If the glue was first deposited on the sheets, the glued edge portions were moistened in the machine with a setting agent. On the other hand, if the setting agent were applied first, the depositing of the glue on the edges of the sheet was effected in the machine. In any case a preliminary treatment of the sheet edges to be glued together was required.

I have succeeded in altogether avoiding this preliminary treatment and to carry through the preliminary deposition as well as the drying and subsequent deposition of the gluing or setting material in a single operation and by means of a single machine, so that the veneer sheets fed into the machine merely pass once through the machine and leave it in finished condition.

To this end, I provide the machine with means whereby the veneer sheets are uniformly fed through the machine throughout the treatment in question, and this in such manner that a gap is first left between them in which the glue or the setting agent is deposited on the edges, to be thereafter dried by means of a current of hot air, whereupon the setting agent (or inversely first the setting agent and thereafter the glue) is applied. The veneer sheets are then closed, assembled and pass through the gluing space proper in close juxtaposition.

In the drawings affixed to this specification and forming part thereof two forms of a machine embodying my invention are illustrated diagrammatically by way of example. In the drawings Fig. 1 is a front elevation and Fig. 2 is a side elevation of the first modification, Fig. 3 being a cross-sectional view, drawn to a larger scale, of a detail of Fig. 2, while Fig. 4 is a section on the line 4—4 in Fig. 1.

Figure 1:
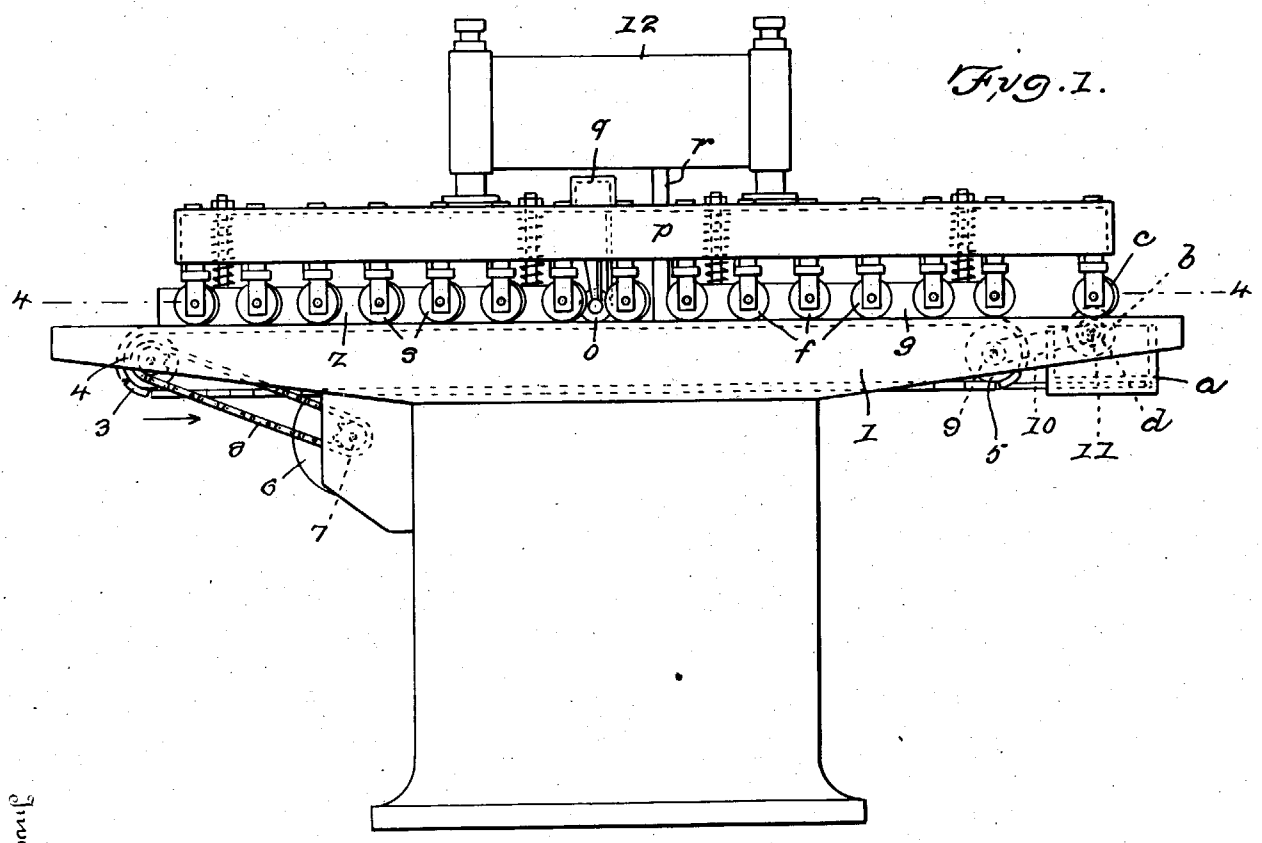
Figure 2:
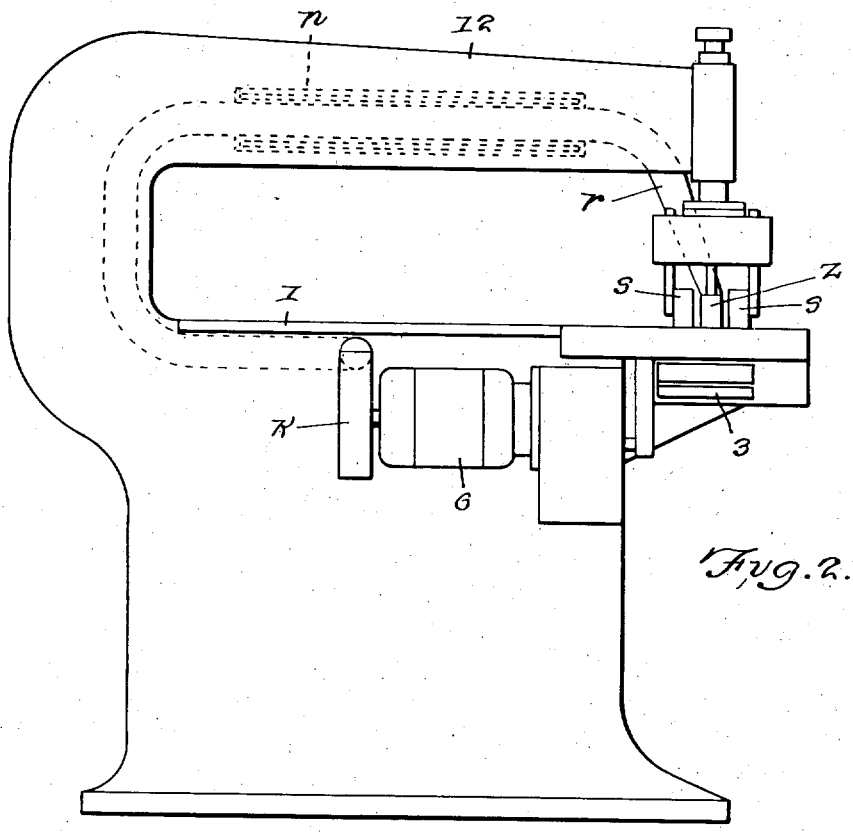
Figure 3:
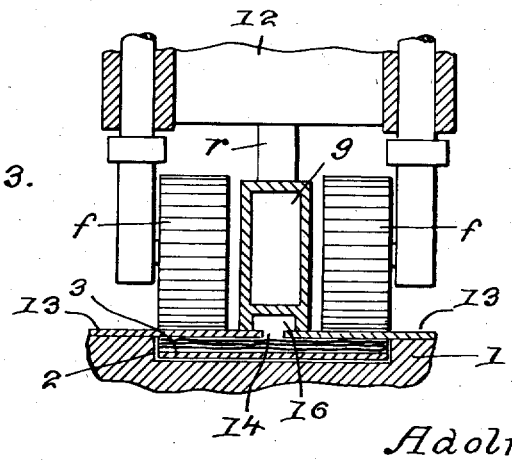
Figure 4:
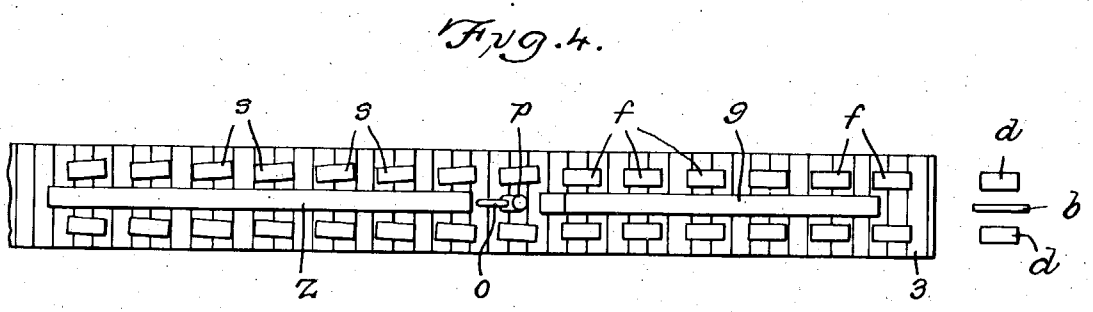
Figure 5:
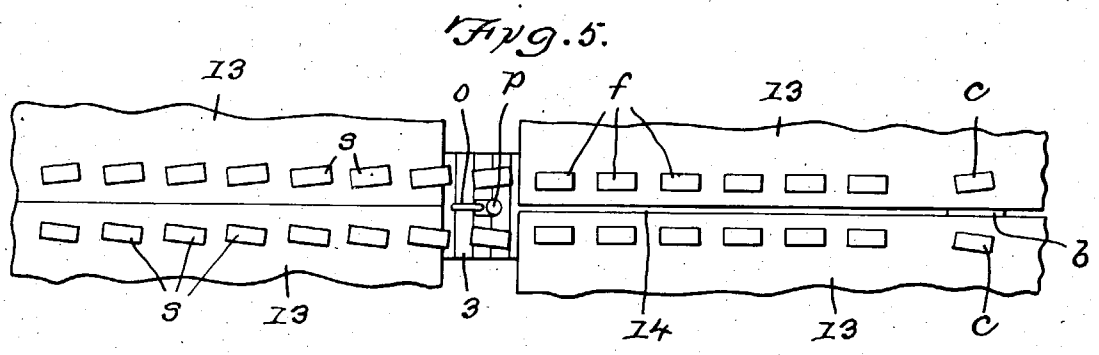
Fig. 5 is a diagram corresponding to Fig. 4 which shows the way in which the veneer sheets travel through the machine.

Referring to the drawings and first to Figs. 1–5, 1 is the machine table and 2 is a depression or channel extending longitudinally of the table, while 3 is a conveyer chain passing over sprockets 4 and 5 and extending through the channel 2. The sprocket 4 is driven by an electric motor 6, sprocket 7 and chain 8 in the direction of the arrow. From a sprocket 9 mounted on the shaft of the sprocket 5 a shaft 11 is driven by means of a chain 10, this shaft carrying a glue depositing disk *b* mounted between two rollers *d* slightly projecting above the table surface, the disk *b* running in the glue tank *a*. An arm 12 on the machine supports a number of rollers *f* serving to exert pressure from above onto the veneer sheets 13 to be treated, these rollers extending above the conveyer chain 3. Rollers *c* are arranged above the rollers *d* so as to slightly converge in the direction of travel in such manner as to force the veneer sheets from either side towards the gluing disk *b*.

In the direction of feed there now follow several pairs of rollers *f* which are disposed exactly in the direction of feed and thus maintain the veneer sheets in spaced relation with a gap 14 between them, the width of which is determined by the thickness of the disk *b*. On the arm 12 is disposed above the gap 14 a heater *g* heated by steam, by electricity or by some other means and which extends downwardly in close vicinity to the veneer sheets 13, but is formed directly above the gap 14 with a channel 16, through which hot air may be blown by means of a tube *r* heated by a heater *n* of some suitable type and fed with hot air by a fan *k* which is preferably mounted on the shaft of the electric motor 6.

In the direction of feed pairs of obliquely arranged rollers *s* are provided to the rear of the rollers *f*, the rollers *s* converging in the direction of feed. Between the rollers of the first pair of rollers *s* is arranged a device for depositing onto the edges previously supplied with glue the setting agent. This device is formed of a container *q*, a feed pipe *p* and a feed disk *o*, which acts on the parts adjoining the gap.

The converging rollers *s* disposed to the rear of this device press the sheets 13 against each other while feeding them along. Above the glued joint is arranged another heating device *z* serving to dry the glue in the joint.

Under the influence of pressure and heat the glue deposited on the edges of the sheets now sets, being influenced by the setting agent.

As mentioned above either the glue or the setting agent may be supplied by the disk *b* and similarly either the setting agent or the glue may be deposited by the disk *o*.

A device according to this embodiment of the invention operates about as follows:

The veneer sheets are fed in spaced relation to the glue supplying disk *b* being carried along by the rollers *d* and held down on these latter by the converging rollers *c*, which also press the edges of the sheets towards the disk *b*. The sheets are then conveyed further by the chain 3, being held in spaced relation by the rows of parallel rollers *f*. Hot air is blown against the edges to dry that glue. Now the setting agent, if any such agent is required, is supplied from the container *q* by means of the disk *o*, whereupon the sheets are gripped by the rows of converging rollers *s* and forced against each other, another heating device such as *z* acting on the glued joint.

I may use glue to which the setting agent has previously been added and in that case only the depositing device near the feed end of the machine, of which the disk *b* forms a part, need be used, while the depositing device in the middle, of which the disk *o* forms part, may be dispensed with. The same applies to the case where a glue is used, which does not require the addition of any setting agent.

Figure 6:
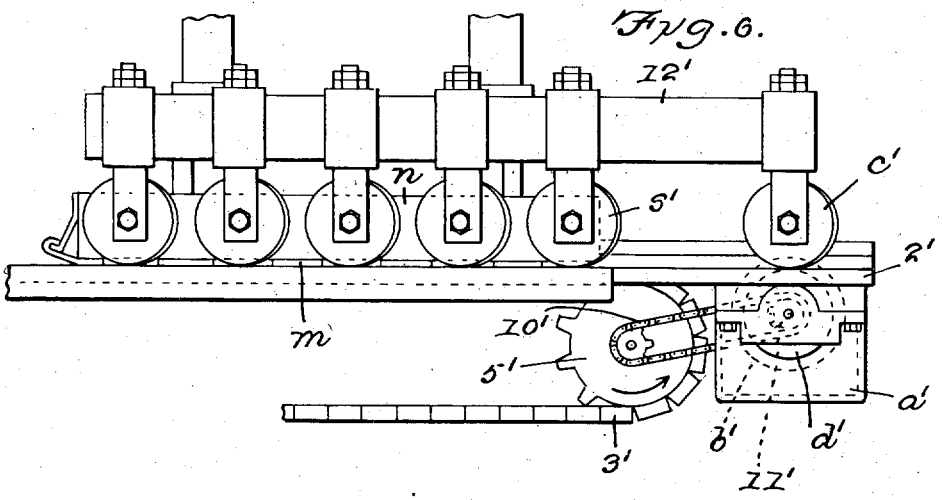
Fig. 6 is a side elevation of the second modification.
Figure 8:
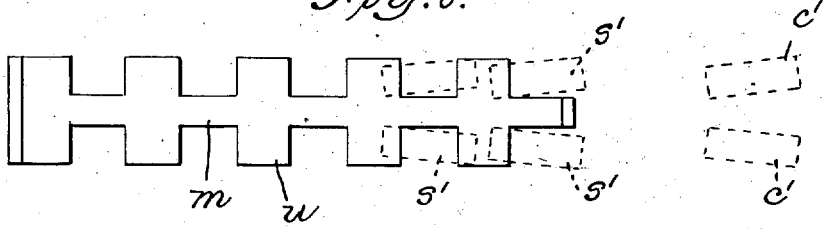
Fig. 8 illustrates a detail.
Figure 7:
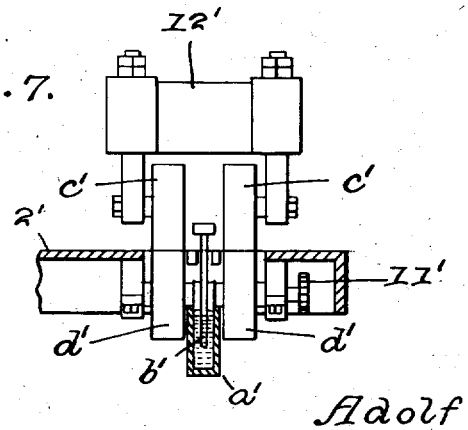
Fig. 7 is a corresponding front view.

In the modification illustrated in Figs. 6 to 8 the device for pressing the sheet edges against each other is arranged nearer to the glue depositing disk, so as to act already on the sheets at the point where the glue and/or setting agent are deposited thereon. In the space between the pairs of rollers serving to press the sheets against each other and the rollers following them means for holding the sheets down on the table, preferably in the form of a correspondingly shaped metal plate, may be provided, which covers the marginal portions of the sheets to be assembled at those places where the rollers cannot act directly on the sheets.

Here again an endless chain 3' extends through the channel 2' in the working table and is driven by sprockets, one of which (5') is driven in the direction of the arrow in Fig. 6. The chain serves for feeding the veneer sheets through the machine. Above this chain are arranged pairs of rollers *s'* mounted on the arm 12'. From the shaft of the front sprocket a binder depositing disk *b'* is driven by means of a chain 10' and sprocket 11' which serves to deposit the glue or the setting agent provided in a tank *a'* on the adjoining edges of the sheets to be assembled.

On either side of this binder depositing disk are provided drive rollers *d'* serving to press the sheets against each other, these rollers being preferably mounted on the same shaft as the disk *b'*. Above the rollers are mounted pressure rollers *c'*. Owing to this arrangement the sheets are already safely held in the vicinity of the point where the binder is deposited and are pressed correctly against the binder depositing disk.

In order to prevent the sheets from following up or from overlapping each other, a metal plate *m* is arranged between the rollers *s'*, which adjoins the bottom edge of the heater *n*, and as shown for instance in Fig. 8, is cut out in such manner that its middle portion extends between the rollers of the pairs of rollers, while lateral projections *u* project between consecutive pairs of rollers. The metal plate *m* acts as a shoe and presses the veneer joint against the chain.

The rollers *c'* and the rollers *s'* are arranged in slightly converging position, so that they tend to press the veneer sheets against each other.

It is essential that the pressing rollers acting near the binder depositing device be driven. On the other hand the binder depositing disk *b'* might also be loose on the driven shaft and might be carried along by the sheet edges.

The operation of the modification according to Figs. 6 to 8 is about as follows:

The veneer sheets are fed to the binder supplying disk *b'*, receive the binding agent on their adjacent edges and are now conveyed through the machine, the rollers *c'* and *s'* firmly pressing the edges against the disk *b'* or against each other, respectively. During its travel through the machine, the binder in the joint sets under the influence of the heat, the metal plate *m* with its lateral projections *u* preventing the sheets from following up or overlapping each other.

I wish it to be understood that I do not desire to be limited to the exact details of construction shown and described for obvious modifications will occur to a person skilled in the art.

I claim:

1. A machine for edgewise gluing veneer sheets together, comprising in combination, veneer sheet conveying means, a binder supplying means in front of said conveying means, two converging rollers flanking said binder supplying means, a plurality of pairs of parallel rollers arranged behind said converging rollers and a plurality of converging rollers arranged in series with said parallel rollers.

2. A machine for edgewise gluing veneer sheets together, comprising in combination, veneer sheet conveying means, a binder supplying means in front of said conveying means, two converging rollers flanking said binder supplying means, a plurality of pairs of parallel rollers arranged behind said converging rollers, another binder supplying means behind said parallel rollers and a plurality of converging rollers behind said other binder supplying means.

3. A machine for edgewise gluing veneer sheets together, comprising in combination, veneer sheet conveying means, a binder supplying means in front of said conveying means, two converging rollers flanking said binder supplying means, a plurality of pairs of converging rollers arranged in series with said two rollers, and a metal plate having a center portion extending intermediate the rollers of each pair and lateral projections extending intermediate consecutive rollers, whereby to hold the sheets down on said conveying means.

ADOLF FRIZ.